(12) United States Patent
Peuhkurinen et al.

(10) Patent No.: US 12,511,793 B2
(45) Date of Patent: *Dec. 30, 2025

(54) IMAGE ENCODING BASED ON VELOCITY CHANNEL

(71) Applicant: Varjo Technologies Oy, Helsinki (FI)

(72) Inventors: Ari Antti Erik Peuhkurinen, Helsinki (FI); Timo Suoranta, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 411 days.

This patent is subject to a terminal disclaimer.

(21) Appl. No.: 18/146,404

(22) Filed: Dec. 26, 2022

(65) Prior Publication Data

US 2024/0212222 A1   Jun. 27, 2024

(51) Int. Cl.
*G06T 9/40* (2006.01)
*G06T 3/40* (2024.01)
(Continued)

(52) U.S. Cl.
CPC ............... *G06T 9/40* (2013.01); *G06T 3/40* (2013.01); *G06T 3/60* (2013.01); *H04N 19/119* (2014.11); *H04N 19/139* (2014.11); *H04N 19/507* (2014.11); *H04N 19/53* (2014.11); *H04N 19/96* (2014.11); *H04N 19/186* (2014.11)

(58) Field of Classification Search
CPC .... G06T 9/40; G06T 3/40; G06T 3/60; G06T 9/004; H04N 19/105; H04N 19/10; H04N 19/102; H04N 19/117; H04N 19/119; H04N 19/134; H04N 19/136; H04N 19/137; H04N 19/139; H04N 19/17; H04N 19/172; H04N 19/174; H04N 19/176; H04N 19/182; H04N 19/186; H04N 19/1883; H04N 19/192; H04N 19/194; H04N 19/197; H04N 19/30; H04N 19/31; H04N 19/33; H04N 19/39; H04N 19/46; H04N 19/50; H04N 19/503; H04N 19/507; H04N 19/51; H04N 19/513; H04N 19/517; H04N 19/53; H04N 19/543;
(Continued)

(56) References Cited

U.S. PATENT DOCUMENTS

5,583,573 A * 12/1996 Asamura .............. H04N 9/8047
375/E7.14
6,829,301 B1 * 12/2004 Tinker ................. H04N 19/103
375/E7.081
(Continued)

*Primary Examiner* — Matthew C Bella
*Assistant Examiner* — Nicholas John Helco
(74) *Attorney, Agent, or Firm* — Ziegler IP Law Group, LLC (57) ABSTRACT

Disclosed is an encoder for encoding images, the encoder having a processor configured to obtain colour data of colour channels of a given image and velocity data of a velocity channel of the given image, wherein the colour data and the velocity data respectively comprise colour values and velocity vectors of pixels of the given image; identify a plurality of groups of neighbouring pixels in the given image, wherein pixels of a given group have at least one of: velocity vectors that lie within a predefined threshold angle from each other, velocity vectors whose magnitude lie within a predefined threshold value from each other; divide the colour data and the velocity data of the given image into their own respective blocks, based on the identified plurality of groups; and encode the blocks into encoded data.

21 Claims, 4 Drawing Sheets

(51) Int. Cl.
*G06T 3/60* (2024.01)
*H04N 19/119* (2014.01)
*H04N 19/139* (2014.01)
*H04N 19/186* (2014.01)
*H04N 19/507* (2014.01)
*H04N 19/53* (2014.01)
*H04N 19/96* (2014.01)

(58) Field of Classification Search
CPC .... H04N 19/573; H04N 19/58; H04N 19/583; H04N 19/86; H04N 19/96
See application file for complete search history.

(56) References Cited

U.S. PATENT DOCUMENTS

| | | | |
|---|---|---|---|
| 8,891,626 B1* | 11/2014 | Bankoski | H04N 19/137 375/240.16 |
| 9,131,202 B1* | 9/2015 | Espeset | H04N 19/139 |
| 10,701,390 B2* | 6/2020 | Li | H04N 19/54 |
| 2004/0013196 A1* | 1/2004 | Takagi | H04N 19/61 375/E7.176 |
| 2005/0286635 A1* | 12/2005 | Kumar | H04N 19/197 375/E7.176 |
| 2018/0232865 A1* | 8/2018 | Chiba | G06T 7/90 |
| 2019/0289322 A1* | 9/2019 | Abbas | H04N 19/46 |
| 2019/0387242 A1* | 12/2019 | Toma | H04N 19/537 |
| 2020/0021841 A1* | 1/2020 | Leontaris | H04N 19/105 |
| 2021/0006803 A1* | 1/2021 | Zhang | H04N 19/583 |
| 2023/0082705 A1* | 3/2023 | Trepte | G06T 15/04 345/419 |
| 2024/0214588 A1* | 6/2024 | Peuhkurinen | H04N 19/176 |

\* cited by examiner

IMAGE ENCODING BASED ON VELOCITY CHANNEL

TECHNICAL FIELD

The present disclosure relates to encoders for encoding images based on velocity channel. The present disclosure also relates to methods for encoding images based on velocity channel.

BACKGROUND

Encoding is popularly used as a technique for compressing images in order to reduce their size, to transmit the images in a bandwidth-efficient manner across a communication network, to process and load the images in less time, and the like. The process of encoding the images is performed by encoders. The encoders employ compression techniques, for example, such as H.264, H.265, H.266, AOMedia Video 1 (AV1), VP9, and the like, for encoding the images. However, conventional encoders possess certain limitations.

Firstly, the conventional encoders do not have an interface having suitable sample and texture formats for correlating smaller datasets of different types of data of the images. For example, the conventional encoders do not have suitable sample and texture formats to correlate colour data (for example, Red-Green-Blue (RGB) data) and velocity data of the image to create a whole frame data set from these different types of data. As a result, an amount of processing required for encoding the images is quite high as each data of channel of the image is encoded separately. This also results in a high processing time and more burden on computing resources while encoding the images. Secondly, the conventional encoders are unable to understand characteristics of the velocity data and use it for encoding of the colour data and other types of data (for example, such as alpha data, depth data and the like). This leads to inefficient encoding of the velocity data, and suboptimal encoding of the colour data and the other types of data, which is undesirable.

Therefore, in light of the foregoing discussion, there exists a need to overcome the aforementioned drawbacks associated with conventional encoders.

SUMMARY

The present disclosure seeks to provide an encoder for encoding images. The present disclosure also seeks to provide a method for encoding images. An aim of the present disclosure is to provide a solution that overcomes at least partially the problems encountered in prior art.

In one aspect, an embodiment of the present disclosure provides an encoder for encoding images, the encoder comprising a processor configured to:
 obtain colour data of colour channels of a given image and velocity data of a velocity channel of the given image, wherein the colour data and the velocity data respectively comprise colour values and velocity vectors of pixels of the given image;
 identify a plurality of groups of neighbouring pixels in the given image, wherein pixels of a given group have at least one of: velocity vectors that lie within a predefined threshold angle from each other, velocity vectors whose magnitude lie within a predefined threshold value from each other;
 divide the colour data and the velocity data of the given image into their own respective blocks, based on the identified plurality of groups; and
 encode the blocks into encoded data.

In another aspect, an embodiment of the present disclosure provides a method for encoding images, the method comprising:
 obtaining colour data of colour channels of a given image and velocity data of a velocity channel of the given image, wherein the colour data and the velocity data respectively comprise colour values and velocity vectors of pixels of the given image;
 identifying a plurality of groups of neighbouring pixels in the given image, wherein pixels of a given group have at least one of: velocity vectors that lie within a predefined threshold angle from each other, velocity vectors whose magnitude lie within a predefined threshold value from each other;
 dividing the colour data and the velocity data of the given image into their own respective blocks, based on the identified plurality of groups; and
 encoding the blocks into encoded data.

Embodiments of the present disclosure substantially eliminate or at least partially address the aforementioned problems in the prior art, and enable accurate and efficient encoding of the given image by dividing different types of data, namely, the colour data and the velocity data, of the given image into blocks based on the identified groups of neighbouring pixels whose velocity vectors are similar.

Additional aspects, advantages, features and objects of the present disclosure would be made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 4B illustrates division of colour data of the given image of FIG. 4A into blocks, while

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an encoder for encoding images, the encoder comprising a processor configured to:
  obtain colour data of colour channels of a given image and velocity data of a velocity channel of the given image, wherein the colour data and the velocity data respectively comprise colour values and velocity vectors of pixels of the given image;
  identify a plurality of groups of neighbouring pixels in the given image, wherein pixels of a given group have at least one of: velocity vectors that lie within a predefined threshold angle from each other, velocity vectors whose magnitude lie within a predefined threshold value from each other;
  divide the colour data and the velocity data of the given image into their own respective blocks, based on the identified plurality of groups; and
  encode the blocks into encoded data.

In another aspect, an embodiment of the present disclosure provides a method for encoding images, the method comprising:
  obtaining colour data of colour channels of a given image and velocity data of a velocity channel of the given image, wherein the colour data and the velocity data respectively comprise colour values and velocity vectors of pixels of the given image;
  identifying a plurality of groups of neighbouring pixels in the given image, wherein pixels of a given group have at least one of: velocity vectors that lie within a predefined threshold angle from each other, velocity vectors whose magnitude lie within a predefined threshold value from each other;
  dividing the colour data and the velocity data of the given image into their own respective blocks, based on the identified plurality of groups; and
  encoding the blocks into encoded data.

The present disclosure provides the aforementioned encoder for encoding images and the method for encoding images. The encoder beneficially utilises the colour data and the velocity data together to encode the given image, resulting in improved quality of the encoded data. Dividing the colour data and the velocity data of the given image into the blocks, based on the identified groups of neighbouring pixels whose velocity vectors are similar, allows for a fast and efficient encoding of the given image. Moreover, the velocity data can be used to accurately determine motion of pixels in consecutive images, thereby fully or almost fully replacing need of motion vector calculation. This significantly reduces time required for encoding the given image and thus, less computation is required to be performed resulting in reduced burden on computing resources. Furthermore, utilization of the velocity data and the colour data of the given image results in significantly enhanced accuracy of the encoded data of the given image and results in minimum or nil loss while encoding the given image. Beneficially, the method is easy to implement and provides fast results.

Herein, the term "encoder" refers to specialized equipment that, in operation, encodes images. The encoder encodes the given image into the encoded data having a comparatively smaller size than a size of the given image. Encoding of the given image is performed to compress the given image, so as to enable in efficient storage of the given image (for example, in a data repository), efficient transfer of the given image to a decoder, and the like.

Throughout the present disclosure, the term "colour channel" of the given image refers to a component of the given image in which the colour data of the given image is stored. The colour data includes colour values for each pixel in the given image. The given image may have a single colour channel (for example, when the given image is a monochrome image) or multiple colour channels (for example, when the given image is a polychrome image). The multiple colour channels may store the colour data of the given image in any format. Examples of such a format include, but are not limited to, a Red-Green-Blue (RGB) format, a Red-Green-Blue-White (RGBW) format, a Red-Yellow-Yellow-Blue (RYYB) format, a Red-Green-Green-Blue (RGGB) format, a luminance-blue projection-red projection (YUV) format, a grayscale format. For example, the given image can have three colour channels—a red colour channel, a green colour channel, and a blue colour channel, wherein the colour data includes colour values in a 24-bit format (i.e., 8-bit values per colour channel). As an example, a colour value of a given pixel may be (64,224,208), which indicates that the given pixel has turquoise colour.

Throughout the present disclosure, the term "velocity channel" of the given image refers to another component of the given image in which velocity data of the given image is stored. The velocity data includes velocity vectors for each pixel or each array of pixels in the given image. When a pixel represents a stationary object or a stationary portion of an object, a velocity vector of said pixel is zero. Alternatively, when a pixel represents a moving object or a moving portion of an object, a velocity vector of said pixel is non-zero. In some cases, the object may not be moving, however, the camera capturing the given image may be moving. In such cases, the velocity vector of the pixels representing the object may be non-zero. The velocity vector is indicative of a speed and a direction of movement of the moving object or the moving portion of an object, represented in the given image. In other words, the velocity vector indicates a velocity with which a pixel is moving from one frame to another. This velocity is expressed in terms of a magnitude of displacement of the pixel per unit time, and a direction of the displacement. As an example, an object may move in a horizontal direction, so a magnitude of the velocity vector of a pixel representing the object may be 2 pixels per millisecond, and a direction of the velocity vector may be the horizontal direction. As another example, an object may move in a vertical direction, so a magnitude of the velocity vector of a pixel representing the object may be 8 pixels per millisecond, and a direction of the velocity vector may be the vertical direction. As yet another example, an object may move in a diagonal direction, so a magnitude of the velocity vector of a pixel representing the object may be 3 pixels per millisecond, and a direction of the velocity vector may be the diagonal direction.

It will be noted that, a resolution of the velocity channel may be different than the resolution of the colour channels. For example, one pixel of the velocity channel may correspond to a 2×2, 3×3 or similar array of pixels of the colour channels. In such a case, the velocity data includes velocity vectors for each array of pixels in the given image.

Optionally, the processor is configured to obtain other data of at least one other channel of the given image, the at least one other channel comprising at least one of: a depth channel, an alpha channel, a surface normal channel, an object identifier channel, a material identifier channel, a specular channel of the given image, wherein the other data of the given image is divided into its own respective blocks. In such a case, the blocks of the other data are also encoded into the encoded data.

The term "depth channel" of the given image refers to a component of the given image in which depth data of the given image is stored. The depth data includes depth values for each pixel in the given image, wherein depth value of a pixel is indicative of a distance between a 3D point (on an object) represented by said pixel from a given position (for example, from a position of a camera that captured the given image, from a reference position used by a device that generated the given image, or similar). The depth channel may store the depth data of the given image in a single format. The depth data can be represented as a grayscale image. As an example, a 3D point on an object may be near to a camera, therefore, a pixel representing said 3D point on the object in the given image may appear light grey and another 3D point on another object may be far from the camera, therefore, a pixel representing the another 3D point in the given image may appear darker.

The term "alpha channel" refers to a component of the given image in which the alpha data of the given image is stored. The alpha data includes alpha values for each pixel in the given image, wherein alpha value of a pixel is indicative of transparency (or opacity) of the pixel. The alpha channel may store the alpha values of the given image in a suitable format. Optionally, the alpha data includes the alpha values in a 8-bit format which indicates 256 levels from fully transparent (i.e., alpha value 0) to fully opaque (i.e., alpha value 255). As an example, an alpha value of a given pixel may be 100, which indicates a transparency of approximately 40 percent. Alternatively, optionally, the alpha channel includes the alpha values in a 4-bit format. As an example, an alpha value of a given pixel may be 8 (from within a range of 0-10), which indicates opacity of approximately 80 percent. It will be appreciated that other formats and ranges for alpha channel values are also feasible. For example, the alpha channel values may lie in a range of 0-1. Optionally, the alpha values are used for blending images, or for making at least a part of an image transparent.

The term "surface normal channel" refers to a component of the given image in which surface normal vectors of the given image are stored. The surface normal vectors convey geometry information of objects or their portions that are represented in the given image.

The term "object identifier channel" refers to a component of the given image in which identifiers of objects represented in the given image are stored. Each pixel of the given image is tagged with identifiers of one or more objects that it represents. The identifiers of objects could have any form, alphabetic, numeric, alphanumeric, symbolic, and the like.

The term "material identifier channel" refers to a component of the given image in which identifiers of material of objects represented in the given image are stored. Each pixel of the given image is tagged with identifiers of one or more materials from which objects (that it represents) are made. The identifiers of material of objects could have any form, alphabetic, numeric, alphanumeric, symbolic, and the like.

The term "specular channel" refers to a component of the given image in which reflectivity data of the given image is stored. The reflectivity data includes reflectivity values of each pixel in the given image, wherein reflectivity value of each pixel is indicative of how reflective a 3D point on an object (represented in the given image) is.

The given image could be obtained by the processor from an image source. Examples of the image source include, but are not limited to, a data repository, a cloud server, and a camera. In such a case, the image source is communicably coupled to the encoder. Alternatively, the given image could be generated by the processor itself.

At an input interface of the encoder, the colour data and the velocity data of the given image could be obtained in an interleaved manner. Alternatively, the velocity data and the colour data of the given image could be obtained as separate data blobs. Moreover, the colour data and the velocity data of the given image could be received in parts. Thus encoding of the given image is implemented time-efficiently, because it is not required to wait for all the data to encode the given image wholly at once, and the given image could be encoded in parts. Therefore, a latency between generation of the encoded data to decoding of the encoded data is also reduced. As an example, the colour data and the velocity data of select pixels, or select rays, or select ray sets may be sent at a time. As another example, the colour data and the velocity data of a gaze-contingent region of the given image may be sent prior to sending the colour data and the velocity data of a remaining region of the given image. As yet another example, the colour data and the velocity data of images for left and right eyes may be sent one after another.

Throughout the present disclosure, the term "group of pixels" refers to a collection of the neighbouring pixels in the given image. The plurality of groups of the neighbouring pixels are identified in order to distinguish between different moving objects or different moving portions of an object represented in the given image. The plurality of groups of the neighbouring pixels are used to further divide the velocity data and the colour data as described below. The plurality of groups may have a varying size depending upon a number of pixels included in the given group. As an example, a given group may comprise a single pixel. As another example, another given group may comprise multiple pixels. The plurality of groups of the neighbouring pixels represents one or more moving objects or one or more portions of the moving objects, represented in the given image.

In one implementation, the plurality of groups may be identified such that the pixels of the given group have the velocity vectors that lie within the predefined threshold angle from each other. In this regard, the velocities of the pixels of the given group are directed in a similar or near similar direction. Optionally, the predefined threshold angle lies in a range of 0 to 45 degrees. More optionally, the predefined threshold angle lies in a range of 0 degree to 30 degrees. Yet more optionally, the predefined threshold angle lies in a range of 0 degree to 20 degrees. As an example, 500 pixels in the given image may represent moving cars and 700 pixels in the given image may represent buildings and other stationary objects. The velocity vectors of the pixels representing the moving cars may lie in a range of 20 degrees from each other, which is within the predefined threshold angle. Thus, groups of neighbouring pixels, from amongst these 500 pixels, may be identified. Optionally, the predefined threshold angle depends on a context of a visual scene represented in the given image. For example, in case of the visual scene depicting a flying bird, the predefined threshold angle between the velocity vectors could be as high as 45 degrees or even more.

In another implementation, the plurality of groups may be identified such that the pixels of the given group have the velocity vectors whose magnitude lie within the predefined threshold value from each other. The pixels of the given group having velocity vectors whose magnitude lie within the predefined threshold value from each other may move together as a group. Optionally, the predefined threshold value lies in a range of 0 to 10 pixels per milliseconds. More optionally, the predefined threshold value lies in a range of 0 to 2 pixels per milliseconds. It will be appreciated that the predefined threshold value depends on the resolution of the given image. Notably, if the resolution doubles, the predefined threshold value would also need to double, to accommodate the change in the resolution. Continuing from the above example, the pixels representing the moving cars may have the velocity vectors whose magnitude may be equal to 2 pixels per milliseconds, which is within the predefined threshold value. Thus, groups of neighbouring pixels, from amongst these 500 pixels, may be identified. It will be appreciated that the magnitude of the velocity vectors of the pixels may be known along with their optical depth. In such a case, an actual distance covered by a given pixel in a 3D space (namely, a real-world environment) can be determined.

In yet another implementation, the plurality of groups may be identified such that the pixels of the given group have the velocity vectors that lie within the predefined threshold angle from each other, and have the velocity vectors whose magnitude lie within the predefined threshold value from each other.

Throughout the present disclosure, the term "block" refers to a portion of a given image, namely a set of neighbouring pixels in the given image which can be processed together during encoding. A number of blocks into which the given image is divided may be fixed (and optionally, predefined) or may be dynamic. Optionally, when dividing the given image into the blocks, the processor is configured to employ a block coding technique. It will be appreciated that other techniques of dividing the given image into the blocks are well within the scope of the present disclosure. The sizes of the blocks may be 16*16 pixels, 30*30 pixels, 60*90 pixels, 30*120 pixels, 128*128 pixels, and the like. It will be appreciated that entire processing as disclosed in the present disclosure is performed on the "blocks" into which the given image is finally divided.

It will be appreciated that the manner in which the colour data is divided into its own blocks may be same as or may be different from a manner in which the velocity data is divided into its own blocks. The division of the colour data and the velocity data into their respective blocks is described below in further detail.

Notably, the colour data and the velocity data of the given image is divided into their own respective blocks, based on the identified plurality of groups. Larger the number of the plurality of groups of pixels in the given image, larger is the number of the blocks into which the colour data and the velocity data are divided. In some cases, a given group of pixels pertains to a corresponding block of the colour data and a corresponding block of the velocity data. In other words, the given group of pixels has a one-to-one correspondence with the blocks of the colour data and the velocity data. In other cases, another given group of pixels pertains to a plurality of corresponding blocks of the colour data and a plurality of corresponding blocks of the velocity data. In other words, the another given group of pixels has a one-to-many correspondence with the blocks of the colour data and the velocity data. This is particularly a case, for example, when the another given group of pixels is very large in size, and/or when the another given group of pixels has a very complex shape.

Optionally, the colour data of the given image is divided into its respective blocks in a similar manner as the division of the velocity data into its respective blocks. This "similarity" of the manner of division is in terms of sizes of the blocks and/or an arrangement of the blocks. Notably, sizes and/or an arrangement of the respective blocks of the colour data may exactly correspond to the respective blocks of the velocity data or may partially correspond to the respective blocks of the velocity data. Optionally, the respective blocks of the colour data are understood to be divided in the similar manner as the respective blocks of the velocity data when the sizes and/or the arrangement of said blocks are at least 50 percent similar. Advantageously, the technical effect of determining how the colour data and the velocity data of the given image is to be divided based on based on the identified plurality of groups is that corresponding blocks of the colour data and the velocity data can be grouped together accurately during encoding, thereby resulting in simple and efficient encoding of the given image. Moreover, a decision as to how to divide the colour data and the velocity data is not required to be made separately, as the plurality of groups in the given image are already identified, and the same could be used to divide both the colour data and the velocity data.

Optionally, the colour data and the velocity data of the given image are divided into their own respective blocks in a hierarchical manner, based on at least one of:
 a dynamic range of the colour values or the velocity vectors represented in the blocks,
 a manner in which the colour values or the velocity vectors change in the blocks.

In this regard, the term "hierarchical manner" refers to a manner of division of the given image into multiple levels. In the hierarchical manner of division, the given image is initially divided into a plurality of blocks and one or more of blocks from amongst the plurality of blocks are further sub-divided into blocks having smaller sizes. Optionally, in this regard, the given image is divided iteratively. Optionally, the given image is divided into the blocks in the hierarchical manner using at least one of: a quadtree algorithm, a binary tree algorithm, a ternary tree algorithm, a triangle-based algorithm, a K-Dimensional (K-D) tree algorithm.

In one implementation, the colour data and the velocity data of the given image is divided into their own respective blocks in the hierarchical manner based on the dynamic range of the colour values or the velocity vectors represented in the blocks. In this regard, larger the dynamic range of the colour values or the velocity vectors in a given region of the given image, higher is a number of hierarchical divisions performed on the given region of the given image. A high number of divisions are performed in case of a large dynamic range in the given region. The larger number of divisions are performed to obtain a larger number of blocks, resulting in adequately and accurately describing the large dynamic range of the colour values or the velocity vectors (i.e., high frequency of the colour values or the velocity vectors in the given region). When change of the colour values or the velocity vectors in the given region is high, it means that the given region has high frequency of data values. In such a case, the given region of the given image is beneficially divided into a larger number of blocks, wherein subsequent encoding and decoding of such blocks can be beneficially performed with nil or minimal losses. Conversely, fewer divisions are performed when the dynamic range of data represented in the blocks is small. As an example, a given image may have two regions, one region having a large dynamic range and another region having a small dynamic range. In said example, the region having the large dynamic range may beneficially be divided into a larger number of blocks than the region having the small dynamic range.

In another implementation, the colour data and the velocity data of the given image are divided into their own respective blocks in the hierarchical manner based on the manner in which the colour values or the velocity vectors change in the blocks. Optionally, in this regard, the manner in which the colour values or the velocity vectors change in the blocks is indicative of characteristics of the blocks (i.e., how colour values or velocity vectors change in the blocks). The colour values and/or the velocity vectors may change in a linear, non-linear, or step-wise manner. The colour values and/or the velocity vectors may change abruptly or gradually. The colour values and/or the velocity vectors may change randomly, along a given direction, or in a given pattern. Advantageously, the technical effect of dividing the colour data and the velocity data of the given image into multiple blocks is to enable in sufficient capturing (in the encoded data) of the change in the colour values and the velocity vectors of the given block, resulting in efficient and accurate encoding of the given image.

As an example, an image may have a size equal to 900*900 pixels. Herein, velocity data of the velocity channel of the image may be initially divided into four blocks A, B, C and D, each block having a size equal to 450*450 pixels. The manner in which the velocity vectors change in each of the four blocks A-D may be analysed for dividing the given image in the hierarchical manner. If the velocity vectors in the blocks A and D are found to be unchanged or have minimal change, the velocity vectors are considered to be uniform, and therefore, the blocks A and D may not be divided further. If the velocity vectors in the block B are found to be changing in a linear manner, the velocity vectors are considered to be non-uniform and, therefore, the block B may be further divided into four blocks B1, B2, B3 and B4, each having a size equal to 225*225 pixels. Similarly, if the velocity vectors in the block C are found to be changing in the non-linear manner, the velocity vectors are considered to be non-uniform and therefore, the block C may be further divided into four blocks C1, C2, C3 and C4, each having a size equal to 225*225 pixels. Moreover, if the velocity vectors in any one of the blocks B1-B4 and c1-C4 are found to changing in a non-linear manner, the velocity vectors are considered to be non-uniform, and therefore, such a block may be further divided into smaller blocks in an iterative manner.

In yet another implementation, the given image is divided into the blocks in the hierarchical manner, based on the dynamic range of the colour values or the velocity vectors represented in the blocks, and the manner in which the colour values or the velocity vectors change in the blocks.

Optionally, the blocks of the colour data and the blocks of the velocity data are at a same level of division depth. Herein, the term "division depth" refers to a number of times the given image is divided hierarchically to obtain the blocks of a given data. A high division depth is indicative of a deep hierarchy having a high number of sub-divisions, and vice versa. When the blocks of the colour data and the blocks of the velocity data are at the same level of division depth, it means that a size of a smallest block in the blocks of the colour data and a size of a smallest block in the blocks of the velocity data is same. In this case, the colour data and the velocity data share a block division structure fully. For example, the velocity data of the given image may be divided into six blocks A, B, C, D, E and F each having equal sizes. The aforesaid blocks may be considered to be at a first level of division depth. Amongst the six blocks A-F, the blocks A and C may be further divided into four blocks each as blocks A1, A2, A3, A4, and blocks C1, C2, C3 and C4, respectively. The blocks A1-A4 and C1-C4 are at a second level of division depth. Further, the blocks A1 and C1 may be divided into two blocks each as blocks A11 and A12, and blocks C11 and C12, respectively. The blocks A11, A12, C11 and C12 are at a third level of division depth. In said example, the velocity data is divided down to three levels of division depth. The colour data may also be divided down to three levels of division depth, in a same manner or in a different manner. Advantageously, the technical effect of the same level of the division depth is that it results in division of the colour data and the velocity data of the given image into the blocks in a time-efficient manner, thereby, significantly reducing processing time. This is particularly beneficial in a case where a decision as to how to divide one of the colour data and the velocity data is also utilised to divide another of the colour data and the velocity data. In other words, the division of the colour data and the velocity data could be performed based on the aforesaid analysis of only one of the colour data and the velocity data (namely, based on at least one of: the dynamic range of data represented in the blocks, the manner in which data values change in the blocks).

Alternatively, optionally, when dividing, the processor is configured to:
initially divide the colour data and the velocity data into respective blocks at a same level of division depth; and
further divide at least one block of the colour data into smaller blocks, based on a dynamic range of colour values in the at least one block of the colour data.

The same level of division depth up to which the initial division of the colour data and the velocity data is performed can be determined for example, based on the aforesaid analysis of only the velocity data (namely, based on at least one of: the dynamic range of the velocity data represented in the blocks, the manner in which velocity vectors change in the blocks). Optionally, upon dividing the colour data and the velocity data into their respective blocks, the at least one block of the colour data is further analysed to determine an amount of change in the colour values in each block. Optionally, the at least one block of the colour data is divided further iteratively. When the colour values in the at least one block is found to change, for example, abruptly or non-linearly, the given block is divided further to capture the change in the colour values accurately and adequately.

In an example, the colour data and the velocity data of the given image may be divided at a first level of division depth into three blocks, P, Q, R and L, M, N, respectively. Next, each of the blocks P, Q, R and three blocks L, M, N of the colour data and the velocity data, respectively are further analysed, wherein the block P and the block M are found to have the change in the colour values and velocity vectors, respectively. Thus, the block P may be divided further into three blocks, P1, P2, P3 while the block M may be divided further into three blocks M1, M2 and M3. Next, if the block P1 is found to have changes in the colour values, the block P1 may be divided further into two blocks, P11 and P12. In said example, the colour data and the velocity data are initially divided down to equal division depth, which is two levels, and further the colour data is sub-divided down to one more level. Advantageously, the technical effect of further dividing the blocks into the smaller blocks is that the change in the colour values can be adequately captured leading to accurate encoding of the given image. The technical benefit of initially dividing the colour data and the velocity data to the same division depth is that a decision as to how to divide one of the colour data and the velocity data can also be utilised to divide another of the colour data and the velocity data. In other words, the initial division of the colour data and the velocity data could be performed based on the aforesaid analysis of only one of the colour data and the velocity data (namely, the dynamic range of at least one of: the colour values or the velocity vectors represented in the blocks, the manner in which at least one of: colour values or velocity vectors change in the blocks). The technical benefit of further dividing the at least one block of the colour data into smaller blocks is that said data is divided according to the dynamic range of the data, thereby leading to a more efficient encoding of said data.

Optionally, when dividing, the processor is configured to:
    initially divide the colour data and the velocity data into respective blocks at a same level of division depth; and
    further divide at least one block of the velocity data into smaller blocks, based on a dynamic range of velocity vectors in the at least one block of the velocity data.

Optionally, in this regard, upon dividing the colour data and the velocity data into their respective blocks, the at least one block of the velocity data is further analysed to determine an amount of change in the velocity vectors in each block. Optionally, the at least one block of the velocity data is divided further iteratively. When the velocity vectors in the at least one block is found to change, for example, abruptly or non-linearly, the given block is divided further to capture the change accurately and adequately.

In an example, the colour data and the velocity data of the given image may be divided at a first level of division depth into three blocks, X, Y, X and three blocks U, V, W, respectively. Next, each of the blocks X, Y, Z and the blocks U, V, W of the colour data and the velocity data, respectively are further analysed, wherein if the block X and the block U are found to have changes in the colour values and velocity vectors, respectively. Thus, the block X may be divided further into three blocks, X1, X2, X3 while the block U may be divided further into three blocks, U1, U2, U3. Next, if the block U2 is found to have changes in the velocity vectors, the block U2 may be divided further into two blocks, U21 and U22. In said example, the colour data and the velocity data are divided down to equal division depth, which is two levels, and further the velocity data is sub-divided down to one more level. Advantageously, the technical effect of further dividing the velocity data into the smaller blocks is that the change in the velocity vectors can be adequately captured leading to accurate encoding of the given image. The technical benefit of initially dividing the colour data and the velocity data to the same division depth is that a decision as to how to divide one of the colour data and the velocity data can also be utilised to divide another of the colour data and the velocity data. In other words, the initial division of the colour data and the velocity data could be performed based on the aforesaid analysis of only one of the colour data and the velocity data (namely, the dynamic range of at least one of: the colour values or the velocity vectors represented in the blocks, the manner in which at least one of: colour values or velocity vectors change in the blocks). The technical benefit of further dividing the at least one block of the velocity data into smaller blocks is that the velocity data is divided according to the dynamic range of the velocity data, thereby leading to a more efficient encoding of the velocity data.

It will be appreciated that the at least one block of the colour data and the at least one block of the velocity data could be located at different regions of the given image. As an example, the given image may have a size equal to 500*500 pixels. The colour data is divided into four blocks, namely P, Q, R, S and the velocity data is correspondingly divided into four blocks, namely, A, B, C, D, each having a size equal to 250*250 pixels. Next, upon analysing it is found that the block P of the colour data may have high frequency of the colour values as compared to the corresponding block A of the velocity data, and the block C of the velocity data may have high frequency of the velocity vectors as compared to the corresponding block R of the colour data. Thus, the block P of the colour data and the block C of the velocity data may be divided further into the smaller blocks.

Throughout the present disclosure, the term "encoded data" refers to data that is generated upon encoding the blocks of the colour data and the velocity data of the given image. The encoded data requires less storage and/or transmission resources as compared to the colour data and the velocity data of the given image. Optionally, a given block of the colour data and a corresponding block of the velocity data are encoded together into the encoded data. In other words, the given block of the colour data and the corresponding block of the velocity data are bundled together for encoding. Optionally, the encoded data is sent by the encoder to a decoder, via a communication network. The decoder, in use, decodes the encoded data to generate a given decoded image, the given decoded image being a re-creation of the given image. Advantageously, the technical effect of bundling and encoding of corresponding blocks of different types of data allows for correlating between the different types of data (for example, the velocity data, the colour data and optionally, the other data) for accurately decoding the encoded data to recreate the given image with nil or minimal loss.

In some implementations, the colour data and the velocity data are in a Cartesian format. In other implementations the colour data and the velocity data are in a non-Cartesian format. Examples of the non-Cartesian formats are a polar format, a 360-degrees canvas format, a screen space format, or similar. In the 360-degrees canvas format, the given image is considered to lie on a surface of a sphere, and the colour data and the velocity data of the given image are expressed accordingly. Advantageously, utilization of the non-cartesian format helps in preserving directionality of the velocity vectors and/or, thereby improving quality of the compression of the colour data and the velocity data. In simpler terms, the non-cartesian format enables in retaining an image quality of the given image upon encoding.

Optionally, when encoding, the processor is configured to:

identify at least one previous block of a previous image corresponding to a given block of the given image, based on velocity vectors of pixels in the given block and a frame time between two consecutive images; and include in the encoded data:
- a reference to previous encoded data of the at least one previous block of the previous image for the given block of the given image, and
- information indicative of at least one of: a position of the given block in the given image, a relative position of the given block with respect to the at least one previous block, a rotation to be applied, a scaling to be applied.

As the processor receives a sequence of images, the processor has access to at least one previous image that is previous to the given image. The at least one previous block could include a single previous block or a set of neighbouring previous blocks. Notably, the at least one previous block is identified based on the velocity vectors of the pixels in the given block and the frame time between two consecutive images. In this regard, the term "frame time" refers to a time elapsed between two consecutive images. Optionally, the frame time depends on the frame rate with which the images are generated/displayed. The frame rate may be expressed in terms of frames per second (FPS). As an example, the magnitude of the velocity vectors of the pixels in the given block of the given image may be 5 pixels per millisecond and a direction of the velocity vector may be the horizontal direction. Assuming that the previous image and the given image are consecutive images, and that the frame time between the previous image and the given image may be 10 milliseconds, the pixels of the given image would have likely displaced by 50 pixels in the horizontal direction between the previous image and the given image. Thus, the processor may identify a position of the at least one previous block in the previous image corresponding to the given block in the given image, based on a displacement of the pixels during the frame time or the time elapsed between the previous image and the given image. Advantageously, the processor is not required to predict the at least one previous block, instead, the processor can easily identify the at least one previous block by looking back in time at a previous image, thus burden on the processor and processing time is significantly reduced.

Optionally, the reference to the previous encoded data is in a form of at least one of: a pointer pointing to the previous encoded data in a stream of the encoded data, a unique identification of the previous encoded data. Including the reference to the previous encoded data of the at least one previous block in the encoded data allows a decoder to access the previous encoded data of the at least one previous block, thereby enabling the decoder to first decode the previous encoded data into a corresponding decoded block and then reproject the corresponding decoded block, so as to re-create the data of the given block of the given image.

Optionally, the aforesaid information included in the encoded data is indicative of the position of the given block in the given image. In this regard, the position of the given block is included so as to accurately position a re-created block corresponding to the given block in the given decoded image, at the time of decoding.

Optionally, said information included in the encoded data is indicative of the relative position of the given block with respect to the at least one previous block. This relative position is provided to accurately re-project the corresponding decoded block of the at least one previous block at the time of decoding and to also enable accurate positioning of the re-created block in the given decoded image.

Optionally, the information included in the encoded data is indicative of the rotation to be applied. In this regard, data of the at least one previous block may be represented from a perspective that is different from a perspective with which data of the given block is represented. In order to compensate for an angular difference between said perspectives, the corresponding decoded block of the at least one previous block may be rotated to obtain the re-created block corresponding to the given block, at the time of decoding. The angular difference between said perspectives is an angular difference between the given pose and the previous pose, and such a compensation is a motion compensation between the given image and the previous image. The rotation to be applied is specified in terms of its magnitude and direction, which enables in accurately re-creating the given block.

Optionally, the information included in the encoded data is indicative of the scaling to be applied. In this regard, the term "scaling" encompasses downscaling and/or upscaling of the corresponding decoded block of the at least one previous block. Optionally, in this regard, data of the corresponding decoded is scaled to match a scale of the given block to obtain the re-created block corresponding to the given block at the time of decoding.

Optionally, the processor is configured to obtain a pose channel of the given image and a pose channel of the previous image, the pose channel of the given image being indicative of a given pose of a given user's head or of a given device from a perspective of which the given image is generated, the pose channel of the previous image being indicative of a previous pose of the given user's head or of the given device from a perspective of which the previous image is generated,
wherein when encoding, the processor is configured to determine at least one of: the relative position of the given block with respect to the at least one previous block, the rotation to be applied, the scaling to be applied, based on a difference between the given pose and the previous pose, the velocity vectors of the pixels in the given block, and velocity vectors of corresponding pixels in the at least one previous block.

In this regard, the pose channel comprises pose data corresponding to the given image and the pose data corresponding to the previous image. The term "pose" encompasses a position and an orientation. The given pose and the previous pose of the given user's head or of the given device is determined with respect to a reference coordinate system in a 3-dimensional (3D) space. Optionally, the 3D space corresponds to a 3D extended reality (XR) environment. Optionally, the given pose and the previous pose of the given user's head or of the given device is determined using a pose-tracking means. The pose-tracking means could be implemented as an internal component of the device worn by the user or the given device, as a tracking system external to the device worn by the user or the given device, or as a combination thereof. The pose-tracking means could be implemented as at least one of: an optics-based tracking system, an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Positioning System (GPS) tracking system. In an example, the given pose and the previous pose of the given user's head is determined by tracking a pose of a wearable device worn by the given user on his/her head. In this case, the pose of the wearable device corresponds to the pose of the given user's head. Examples of the device could be an extended-reality (XR) headset, a pair of XR glasses, and the like. Further, examples of the given device could be a tablet, a laptop, a desktop computer, a camera, or similar. Optionally, the encoder is implemented at the given device, or the wearable device worn by the given user.

The difference between the given pose and the previous pose takes into account a movement of the user's head or the device. The velocity vectors and the time elapsed between the previous image and the given image allow for calculating a displacement of pixels, for example, due to a movement of an object represented by these pixels. Combined together, said difference and said displacement allow for determining at least one of: the relative position of the given block with respect to the at least one previous block, the rotation to be applied, the scaling to be applied.

Optionally, the processor is configured to obtain a pose channel of the given image and a pose channel of the previous image, the pose channel of the given image being indicative of a given pose of a given user's head or of a given device from a perspective of which the given image is generated, the pose channel of the previous image being indicative of a previous pose of the given user's head or of the given device from a perspective of which the previous image is generated, wherein when encoding, the processor is configured to:
   reproject the previous image from the previous pose to the given pose;
   determine whether the at least one previous block of the previous image matches the given block of the given image, based on matching of colour values in the given block of the given image with colour values in the reprojected at least one previous block of the reprojected previous image; and
   include the reference and the information in the encoded data, only when it is determined that the at least one previous block of the previous image matches the given block of the given image.

To "reproject" an image from a first pose to a second pose refers to changing a perspective with which data of the image is represented, from the first pose to the second pose. In simpler terms, a perspective of the image is changed from the first pose to the second pose.

Said reprojection is performed to compensate any motion that would have occurred between the previous image and the given image. Optionally, the reprojection is applied using at least one reprojection algorithm. The at least one reprojection algorithm comprises at least space-warping algorithm. Image reprojection algorithms are well-known in the art. Upon reprojection both the reprojected previous image and the given image represent a same perspective of the 3D space, and therefore their matching blocks can be identified accurately. In this regard, upon reprojecting the previous image, the colour values in the given block are matched with the colour values of the reprojected at least one previous block of the reprojected previous image.

Moreover, upon reprojecting the previous image, missing data values in the reprojected previous image may be generated using suitable image processing techniques (for example, such as inpainting technique, interpolation technique, extrapolation technique, or similar). Optionally, the colour values are said to matching, when there is an exact match or near-exact match (for example, +/−5 percent difference from each other).

Optionally, the processor is configured to obtain a pose channel of the given image and a pose channel of the previous image, the pose channel of the given image being indicative of a given pose of a given user's head or of a given device from a perspective of which the given image is generated, the pose channel of the previous image being indicative of a previous pose of the given user's head or of the given device from a perspective of which the previous image is generated, wherein when encoding, the processor is configured to:
   reproject the given image from the given pose to the previous pose;
   determine whether the at least one previous block of the previous image matches the given block of the given image, based on matching of colour values in the reprojected given block of the reprojected given image with colour values in the at least one previous block of the previous image; and
   include the reference and the information in the encoded data, only when it is determined that the at least one previous block of the previous image matches the given block of the given image.

In this regard, upon reprojecting the given image, the colour values in the reprojected given block are matched with the colour values of the at least one previous block. Moreover, upon reprojecting the given image, missing data values in the reprojected given image may be generated using suitable image processing techniques (for example, such as inpainting technique, interpolation technique, extrapolation technique, or similar). Beneficially, reprojecting the given image from the given pose to the previous pose enables in more accurate matching of the at least one previous block with the given block from a same perspective, i.e., the perspective of the previous pose.

Optionally, when encoding, the processor is configured to encode the given block of the given image as anew in the encoded data, when no previous block of any previous image matches the given block of the given image. When no previous block of any previous image matches the given block of the given image, the processor encodes the given block from scratch. The encoded data of the given block of the given image (encoded as anew) could beneficially be usable later for encoding corresponding block(s) of subsequent images.

Furthermore, optionally, the at least one other channel further comprises a gaze channel indicative of a gaze direction of a given user's eyes. The term "gaze direction" refers to a direction in which the given user's eyes are gazing. The gaze direction may be represented by a gaze vector. Optionally, the gaze direction of the given user's eyes is tracked by a gaze-tracking means. The gaze-tracking means may be implemented in the device associated with the given user, as contact lenses with sensors, cameras monitoring a position, a size and/or a shape of a pupil of a given eye of the user, and the like. Such gaze-tracking means are well known in the art.

Moreover, optionally, the processor is also configured to correlate the colour data and the velocity data of a left image and a right image to be viewed by a left eye and a right eye, respectively. Owing to an overlap between FOVs of the left eye and the right eye, the encoded data of the left image can be efficiently used for encoding the right image, or vice versa. As an example, an encoded data of a given block of the left image can be utilised for a corresponding block of the right image, as explained earlier with respect to the previous image and the given image.

Furthermore, optionally, when encoding, the processor is configured to apply respective channel-specific deblocking filters to the colour values on edges of the blocks of the colour data and the velocity vectors on edges of the blocks of the velocity data. In this regard, the term "deblocking filter" refers to a digital filter that is applied to the given image for smoothening sharp edges between blocks of different channels of the given image during encoding, to avoid formation of perceptible macro-blocks in the given decoded image generated upon decoding the encoded data. Examples of the channel-specific deblocking filters could be, Sample adaptive offset (SAO), Adaptive loop filter (ALF), and the like. Herein, different deblocking filters may be used for different channels of the given image. The channel-specific deblocking filters address characteristics of the specific channels of the given block of the given image, when processing the colour values on the edges of the blocks of the colour data and the velocity vectors on the edges of the blocks of the velocity data. These channel-specific deblocking filters are applied to the colour values of pixels along the edges of the blocks of the colour data and to the velocity vectors of pixels along the edges of the blocks of the velocity data. It will be appreciated that the channel-specific deblocking filter may also be used at the time of decoding. Advantageously, the channel-specific deblocking filters significantly improve visual quality of the re-created image.

Optionally, the processor is further configured to send the encoded data to the decoder. The term "decoder" refers to specialized equipment that, in operation, decodes the encoded data to yield the given decoded image. The given decoded image is a re-creation of the given image and can be understood to be a re-created image. The decoder provides the given decoded image to the given device from the perspective of which the given image is generated or to the wearable device used by the user, or to another device. Optionally, the given device or the wearable device comprises the decoder. Examples of another device could be, a display device, a data repository, a computing device, or similar. Beneficially, the encoded data is transmitted from the encoder to the decoder in a bandwidth-efficient manner. Optionally, when the given image is an XR image, the given decoded image is also an XR image. In such a case, a sequence of decoded images constitutes a visual scene of an XR environment. The decoder optionally executes a method for decoding images which is a converse of the aforesaid method for encoding images, to produce decoded images using encoded data of images that are encoded by the encoder.

Optionally, the decoder comprises a processor configured to execute the method for decoding images. The processor of the decoder is configured to:
  obtain the encoded data, wherein the encoded data comprises encoded colour data of the colour channels of the given image and encoded velocity data of velocity channel of the given image;
  decode the encoded data to obtain decoded blocks of the given decoded image, wherein a given encoded block of the encoded colour data and a corresponding encoded block of the encoded velocity data are decoded together; and
  assemble the decoded blocks of the given decoded image to generate the given decoded image, wherein respective decoded blocks of the colour data and the velocity data are assembled respectively.

Optionally, the encoded data is transmitted from the encoder to the decoder as a bitstream. The processor of the decoder decodes the encoded data to generate the decoded blocks and combines the decoded blocks to generate the given decoded image. The given decoded image is the re-creation of the given image.

The present disclosure also relates to the method for encoding images as described above. Various embodiments and variants disclosed above, with respect to the aforementioned first aspect, apply mutatis mutandis to the method for encoding images.

Optionally, the step of encoding comprises:
  identifying at least one previous block of a previous image corresponding to a given block of the given image, based on velocity vectors of pixels in the given block and a frame time between two consecutive images; and
  including in the encoded data:
    a reference to previous encoded data of the at least one previous block of the previous image for the given block of the given image, and
    information indicative of at least one of: a position of the given block in the given image, a relative position of the given block with respect to the at least one previous block, a rotation to be applied, a scaling to be applied.

Optionally, the method further comprises obtaining a pose channel of the given image and a pose channel of the previous image, the pose channel of the given image being indicative of a given pose of a given user's head or of a given device from a perspective of which the given image is generated, the pose channel of the previous image being indicative of a previous pose of the given user's head or of the given device from a perspective of which the previous image is generated,
wherein the step of encoding comprises:
  reprojecting the previous image from the previous pose to the given pose;
  determining whether the at least one previous block of the previous image matches the given block of the given image, based on matching of colour values in the given block of the given image with colour values in the reprojected at least one previous block of the reprojected previous image; and
  including the reference and the information in the encoded data, only when it is determined that the at least one previous block of the previous image matches the given block of the given image.

Optionally, the method further comprising obtaining a pose channel of the given image and a pose channel of the previous image, the pose channel of the given image being indicative of a given pose of a given user's head or of a given device from a perspective of which the given image is generated, the pose channel of the previous image being indicative of a previous pose of the given user's head or of the given device from a perspective of which the previous image is generated,
wherein the step of encoding comprises:
  reprojecting the given image from the given pose to the previous pose;
  determining whether the at least one previous block of the previous image matches the given block of the given image, based on matching of colour values in the reprojected given block of the reprojected given image with colour values in the at least one previous block of the previous image; and
  including the reference and the information in the encoded data, only when it is determined that the at least one previous block of the previous image matches the given block of the given image.

Optionally, the method further comprising obtaining a pose channel of the given image and a pose channel of the previous image, the pose channel of the given image being indicative of a given pose of a given user's head or of a given device from a perspective of which the given image is generated, the pose channel of the previous image being indicative of a previous pose of the given user's head or of the given device from a perspective of which the previous image is generated, wherein the step of encoding comprises determining at least one of: the relative position of the given block with respect to the at least one previous block, the rotation to be applied, the scaling to be applied, based on a difference between the given pose and the previous pose, the velocity vectors of the pixels in the given block, and velocity vectors of corresponding pixels in the at least one previous block.

Optionally, the step of encoding comprises encoding the given block of the given image as anew in the encoded data, when no previous block of any previous image matches the given block of the given image.

Optionally, the colour data and the velocity data of the given image are divided into their own respective blocks in a hierarchical manner, based on at least one of:

a dynamic range of the colour values or the velocity vectors represented in the blocks, a manner in which the colour values or the velocity vectors change in the blocks.

Optionally, the blocks of the colour data and the blocks of the velocity data are at a same level of division depth.

Alternatively, optionally, the step of dividing comprises:
initially dividing the colour data and the velocity data into respective blocks at a same level of division depth; and
further dividing at least one block of the colour data into smaller blocks, based on a dynamic range of colour values in the at least one block of the colour data.

Optionally, the step of dividing comprises:
initially dividing the colour data and the velocity data into respective blocks at a same level of division depth; and
further dividing at least one block of the velocity data into smaller blocks, based on a dynamic range of velocity vectors in the at least one block of the velocity data.

DETAILED DESCRIPTION OF THE DRAWINGS

Figure 1:
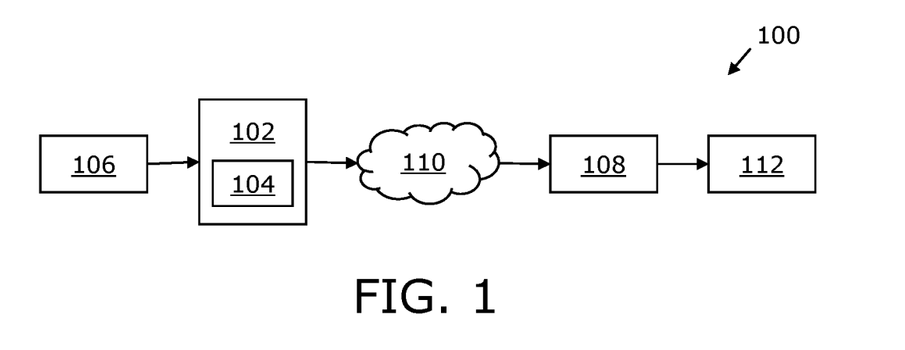
FIG. 1 is a schematic illustration of an exemplary environment in which an encoder for encoding images is in use, in accordance with an embodiment of the present disclosure.

Referring to FIG. 1, illustrated is a schematic illustration of an exemplary environment 100 in which an encoder 102 for encoding images is in use, in accordance with an embodiment of the present disclosure. The encoder 102 comprises a processor 104. The images to be encoded are received by the encoder 102 from an image source 106. The encoder 102, in use, encodes the images to generate encoded data. The encoded data is sent by the encoder 102 to a decoder 108, via a communication network 110. The decoder 108, in use, decodes the encoded data to generate a decoded image. The decoder 108 provides the decoded image to a device 112. The device 112 could, for example, be a wearable device, another display device, a data repository, a computing device, or similar.

FIG. 1 is merely an example, which should not unduly limit the scope of the claims herein. The person skilled in the art will recognize many variations, alternatives, and modifications of embodiments of the present disclosure.

Figure 2:
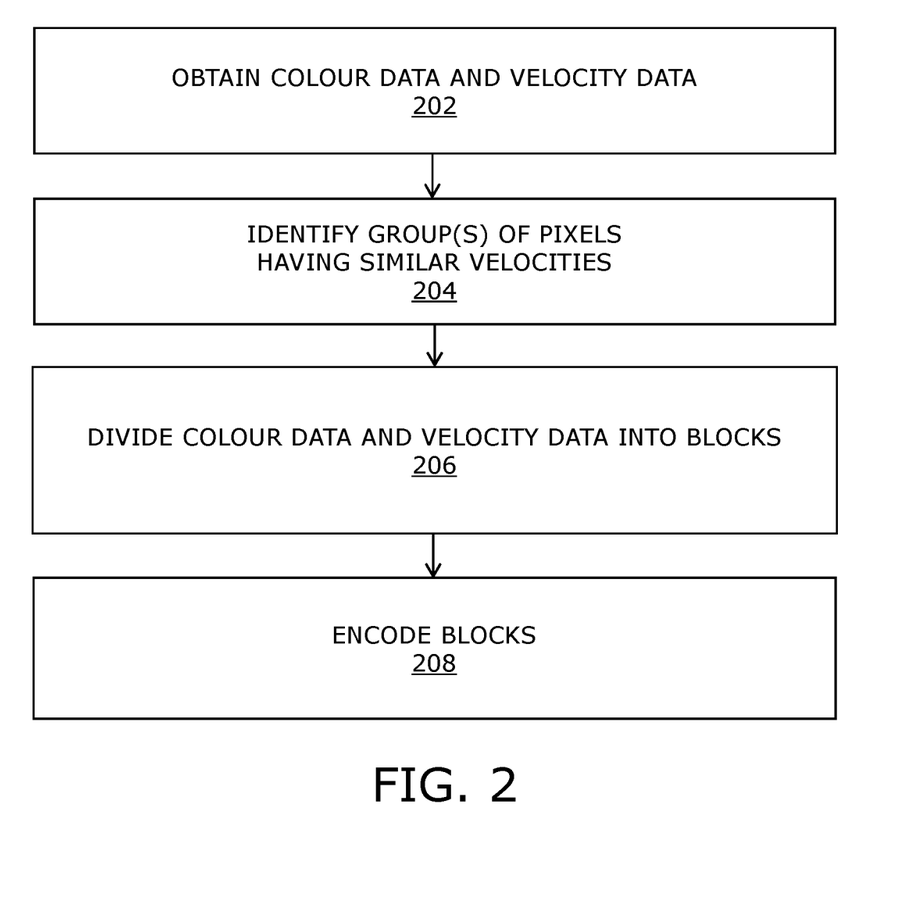
FIG. 2 illustrates steps of a method for encoding images, in accordance with an embodiment of the present disclosure.

Referring to FIG. 2, illustrated are steps of a method for encoding images, in accordance with an embodiment of the present disclosure. At step 202, colour data of colour channels of a given image and velocity data of a velocity channel of the given image is obtained, wherein the colour data and the velocity data respectively comprise colour values and velocity vectors of pixels of the given image. At step 204, a plurality of groups of neighbouring pixels in the given image are identified, wherein pixels of a given group have at least one of: velocity vectors that lie within a predefined threshold angle from each other, velocity vectors whose magnitude lie within a predefined threshold value from each other. At step 206, the colour data and the velocity data of the given image is divided into their own respective blocks, based on the identified plurality of groups. At step 208, the blocks are encoded into encoded data.

The aforementioned steps are only illustrative and other alternatives can also be provided where one or more steps are added, one or more steps are removed, or one or more steps are provided in a different sequence without departing from the scope of the claims herein.

Figure 3A:
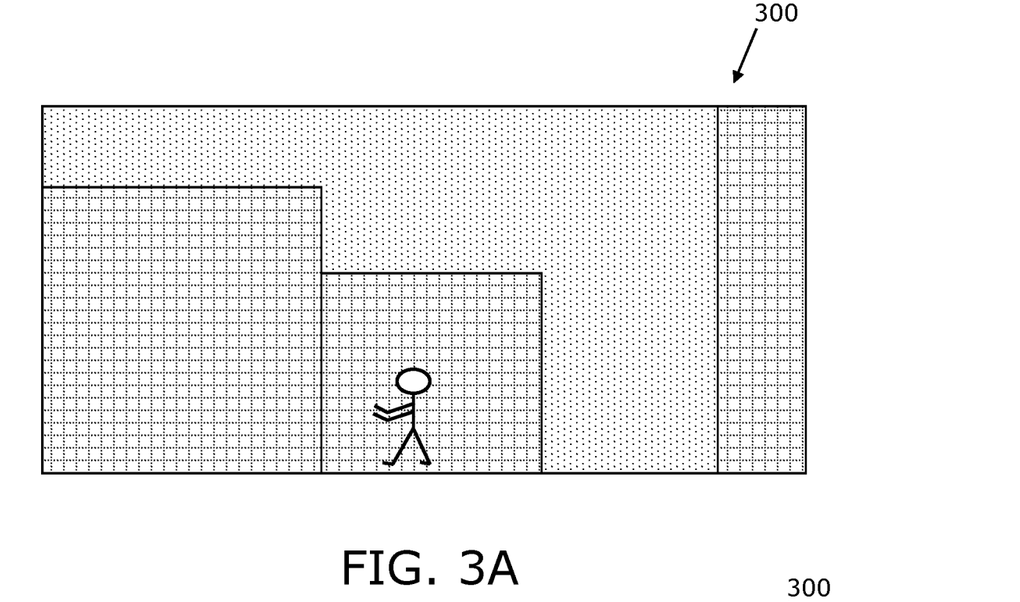
FIG. 3A illustrates a given image that is to be encoded.
Figure 3B:
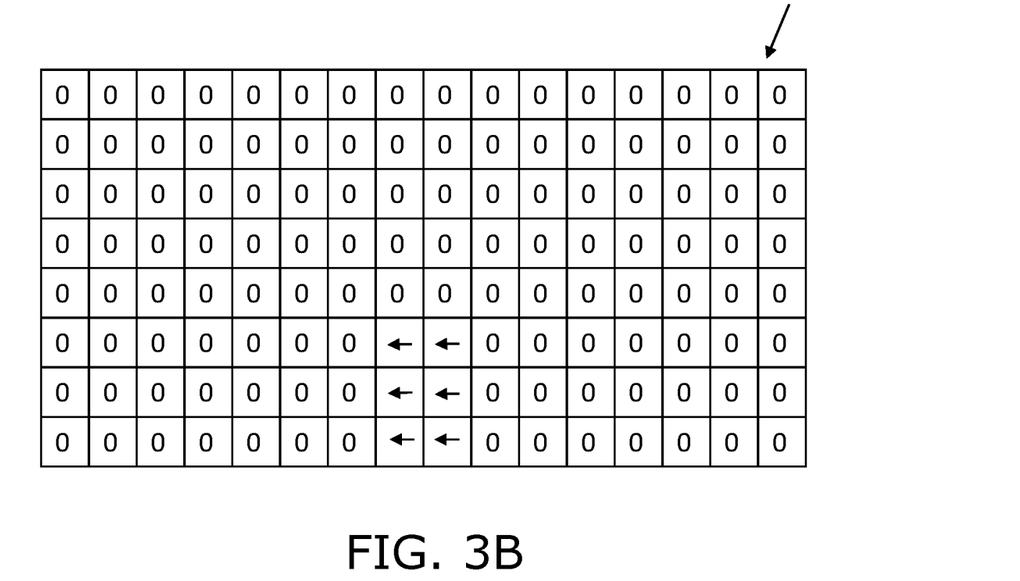
FIG. 3B illustrates velocity vectors of pixels in the given image of FIG. 3A, in accordance with an embodiment of the present disclosure.

Referring to FIG. 3A, illustrated is a given image 300 that is to be encoded, FIG. 3B illustrates velocity vectors of pixels in the given image 300 of FIG. 3A, in accordance with an embodiment of the present disclosure;

In FIG. 3A, the given image 300 is shown to comprise static background such as buildings and sky (depicted as different hatched regions) and a moving person (depicted as a stick figure). In FIG. 3B, a magnitude and a direction of the velocity vectors of the pixels representing the static background and the moving person are represented. The velocity vectors of the pixels representing the static background in the given image 300 are shown to be zero. Further, a magnitude of the velocity vectors of the pixels representing the moving person may be 2 pixels per millisecond and a direction of the velocity vectors may be a horizontal direction (depicted, for example, as multiple arrows).

FIGS. 3A and 3B are merely examples, which should not unduly limit the scope of the claims herein. The person skilled in the art will recognize many variations, alternatives, and modifications of embodiments of the present disclosure.

Figure 4A:
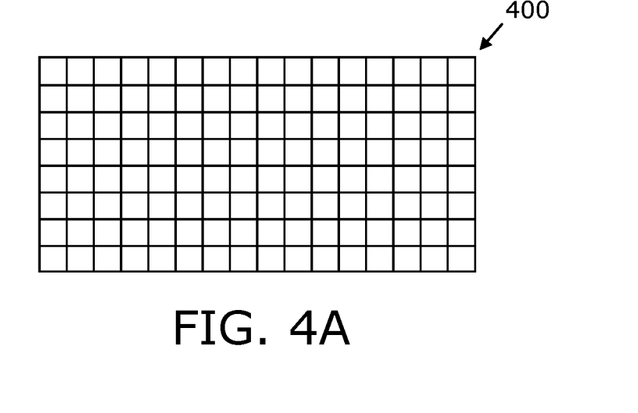
FIG. 4A illustrates a given image that is to be encoded.
Figure 4B:
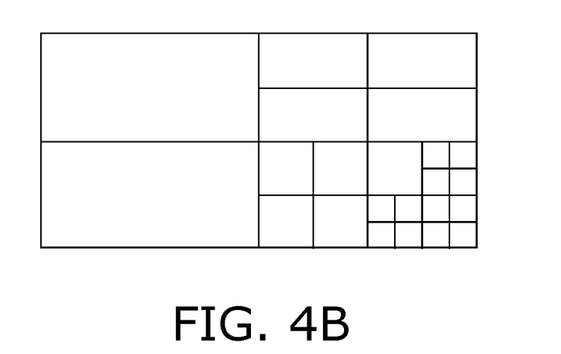
Figure 4C:
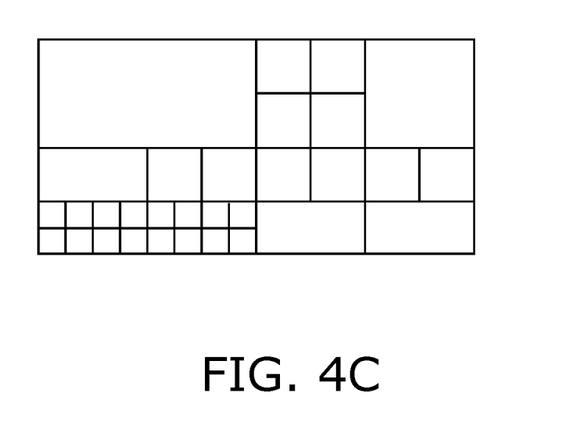
FIG. 4C illustrates division of velocity data of the given image of FIG. 4A into blocks, in accordance with an embodiment of the present disclosure.

Referring to FIG. 4A, illustrated is a given image 400 that is to be encoded, FIG. 4B illustrates division of colour data of the given image 400 of FIG. 4A into blocks, while FIG. 4C illustrates division of velocity data of the given image 400 of FIG. 4A into blocks, in accordance with an embodiment of the present disclosure.

In FIG. 4A, the given image 400 is shown to comprise a plurality of pixels (depicted for example as 128 groups of neighbouring pixels arranged as an 8×16 grid, for sake of convenience only, wherein each group comprises N×N pixels). The given image 400 is divided into blocks, wherein the colour data and the velocity data are divided into their own respective blocks. Optionally, such division is performed in a hierarchical manner, based on at least one of: a dynamic range of the colour values or the velocity vectors represented in the blocks, a manner in which the colour values or the velocity vectors change in the blocks.

In FIG. 4B, the colour data of the given image 400 is shown to be divided into 23 blocks of different sizes (depicted, for example as 2 blocks of 4×8 groups of pixels each, 4 blocks of 2×4 groups of pixels each, 5 blocks of 2×2 groups of pixels each, and 12 blocks of 1 group of pixels each). In FIG. 4C, the velocity data of the given image 400 is shown to be divided into 31 blocks of different sizes (depicted, for example as 1 block 4×8 groups of pixels, 1 block of 4×4 groups of pixels, 3 blocks of 2×4 groups of pixels each, 10 blocks of 2×2 groups of pixels each, and 16 blocks of 1 group of pixels each). With reference to FIGS. 4B and 4C, the blocks of the colour data and the blocks of the velocity data are at different levels of division depth at different portions of the given image 400.

FIGS. 4A-4C are merely examples, which should not unduly limit the scope of the claims herein. The person skilled in the art will recognize many variations, alternatives, and modifications of embodiments of the present disclosure. For example, the colour data and the velocity data may be divided into a same number of blocks having a same size.

Figure 5:
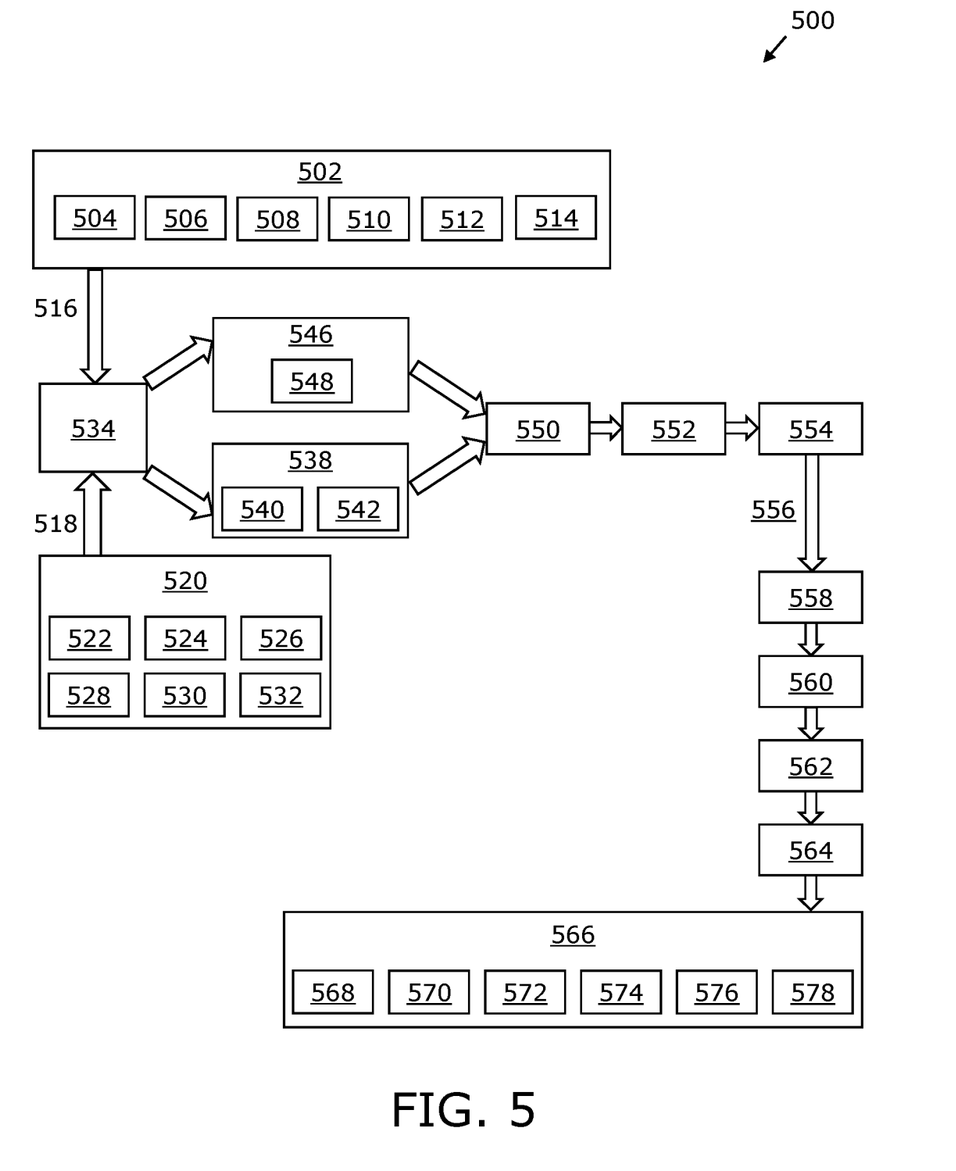
FIG. 5 illustrates an exemplary detailed end-to-end process flow of operation of an encoder and a decoder, in accordance with an embodiment of the present disclosure.

Referring to FIG. 5, illustrated is an exemplary detailed end-to-end process flow 500 of operation of an encoder and a decoder, in accordance with an embodiment of the present disclosure. Data 502 pertaining to a given image is obtained at an input interface of an encoder, wherein the data 502 comprises colour data 504 of colour channels of the given image and velocity data 506 of a velocity channel of the given image. In addition to the colour data 504 and the velocity data 506, the data 502 optionally comprises other data. The other data comprises, for example, at least one of: depth data 508 of a depth channel of the given image, alpha data 510 of an alpha channel of the given image, pose data 512 of a pose channel of the given image, and gaze data 514 of a gaze channel of the given image.

At 516, the given image is divided into blocks, the colour data and the velocity data are divided into their own respective blocks. At 518, historical data 520 pertaining to a previous image is obtained. The historical data 520 comprises historical colour data 522 and historical velocity data 524 of the previous image. In addition to the historical colour data 522 and the historical velocity data 524, the historical data 520 optionally comprises historical other data. The historical other data comprise, for example, at least one of: historical depth data 526, historical alpha data 528, historical pose data 530, and historical gaze data 532, of the previous image.

At 534, at least one previous block of the previous image is identified corresponding to a given block of the given image. When the at least one previous block is identified, inter-compression 538 is performed by including in encoded data: a reference 540 to previous encoded data of the at least one previous block of the previous image for the given block of the given image, and information 542 indicative of at least one of: a position of the given block in the given image, a relative position of the given block with respect to the at least one previous block, a rotation to be applied, a scaling to be applied. When no previous block is identified, intra-compression 546 is performed by encoding the given block of the given image as anew in encoded data. In this regard, at 548, the given block is optionally further divided into blocks of smaller size.

At 550, the blocks (into which the given image is divided) are compressed. At 552, respective channel-specific deblocking filters are applied to colour values on edges of the blocks of the colour data and velocity vectors on edges of the blocks of the velocity data. At 554, the compressed data is entropy coded. Steps 550, 552, and 554 collectively constitute encoding of the blocks into the encoded data.

The encoded data is sent, for example, as a bitstream 556, from the encoder to the decoder. At 558, the encoded data is entropy decoded. At 560, the encoded data is de-compressed. At 562, the blocks are re-created. At 564, the given image is re-created. Steps 558, 560, 562, and 564 collectively constitute decoding of the encoded data into a re-creation of the given image (hereinafter referred to as a re-created image or a decoded image interchangeably, throughout the present disclosure).

Data 566 pertaining to the re-created image is generated at an output interface of the decoder, wherein the data 566 comprises colour data 568 of colour channels of the re-created image and velocity data 570 of velocity channel of the re-created image. In addition to the colour data 568 and the velocity data 570, the data 566 optionally comprises other data. The other data comprises, for example, at least one of: depth data 572, alpha data 574, pose data 576, and gaze data 578, of the re-created image.

FIG. 5 is merely an example, which should not unduly limit the scope of the claims herein. The person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An encoder for encoding images, the encoder comprising a processor configured to:
   obtain colour data of colour channels of a given image and velocity data of a velocity channel of the given image, wherein the colour data and the velocity data respectively comprise colour values and velocity vectors of pixels of the given image;
   identify a plurality of groups of neighbouring pixels in the given image, wherein pixels of a given group have at least one of: velocity vectors that lie within a predefined threshold angle from each other, and/or velocity vectors whose magnitude lie within a predefined threshold value from each other;
   divide the colour data and the velocity data of the given image into their own respective blocks, based on the identified plurality of groups; and
   encode the blocks into encoded data;
   wherein the colour data and the velocity data of the given image are divided into their own respective blocks in a hierarchical manner, based on at least one of:
   a dynamic range of the colour values or the velocity vectors represented in the blocks, and/or
   a manner in which the colour values or the velocity vectors change in the blocks,
   and wherein when dividing, the processor is configured to:
   initially divide the colour data and the velocity data into respective blocks at a same level of division depth; and
   further divide at least one block of the colour data into smaller blocks, based on a dynamic range of colour values in the at least one block of the colour data.

2. The encoder of claim 1, wherein a given block of the colour data and a corresponding block of the velocity data are encoded together into the encoded data.

3. The encoder of claim 1, wherein the predefined threshold angle lies in a range of 0 to 45 degrees.

4. The encoder of claim 1, wherein the predefined threshold value lies in a range of 0 to 10 pixels per milliseconds.

5. The encoder of claim 1, wherein when encoding, the processor is configured to:
   identify at least one previous block of a previous image corresponding to a given block of the given image, based on velocity vectors of pixels in the given block and a frame time between two consecutive images; and
   include in the encoded data:

a reference to previous encoded data of the at least one previous block of the previous image for the given block of the given image, and information indicative of at least one of: a position of the given block in the given image, a relative position of the given block with respect to the at least one previous block, and/or a rotation to be applied, a scaling to be applied.

6. The encoder of claim 5, wherein the processor is configured to obtain a pose channel of the given image and a pose channel of the previous image, the pose channel of the given image being indicative of a given pose of a given user's head or of a given device from a perspective of which the given image is generated, the pose channel of the previous image being indicative of a previous pose of the given user's head or of the given device from a perspective of which the previous image is generated, wherein when encoding, the processor is configured to:
reproject the previous image from the previous pose to the given pose;
determine whether the at least one previous block of the previous image matches the given block of the given image, based on matching of colour values in the given block of the given image with colour values in the reprojected at least one previous block of the reprojected previous image; and
include the reference and the information in the encoded data, only when it is determined that the at least one previous block of the previous image matches the given block of the given image.

7. The encoder of claim 5, wherein the processor is configured to obtain a pose channel of the given image and a pose channel of the previous image, the pose channel of the given image being indicative of a given pose of a given user's head or of a given device from a perspective of which the given image is generated, the pose channel of the previous image being indicative of a previous pose of the given user's head or of the given device from a perspective of which the previous image is generated, wherein when encoding, the processor is configured to:
reproject the given image from the given pose to the previous pose;
determine whether the at least one previous block of the previous image matches the given block of the given image, based on matching of colour values in the reprojected given block of the reprojected given image with colour values in the at least one previous block of the previous image; and
include the reference and the information in the encoded data, only when it is determined that the at least one previous block of the previous image matches the given block of the given image.

8. The encoder of claim 5, wherein the processor is configured to obtain a pose channel of the given image and a pose channel of the previous image, the pose channel of the given image being indicative of a given pose of a given user's head or of a given device from a perspective of which the given image is generated, the pose channel of the previous image being indicative of a previous pose of the given user's head or of the given device from a perspective of which the previous image is generated, wherein when encoding, the processor is configured to determine at least one of: the relative position of the given block with respect to the at least one previous block, the rotation to be applied, and/or the scaling to be applied, based on a difference between the given pose and the previous pose, the velocity vectors of the pixels in the given block, and velocity vectors of corresponding pixels in the at least one previous block.

9. The encoder of claim 5, wherein when encoding, the processor is configured to encode the given block of the given image as anew in the encoded data, when no previous block of any previous image matches the given block of the given image.

10. The encoder of claim 1, wherein when dividing, the processor is configured to:
initially divide the colour data and the velocity data into respective blocks at a same level of division depth; and
further divide at least one block of the velocity data into smaller blocks, based on a dynamic range of velocity vectors in the at least one block of the velocity data.

11. The encoder of claim 1, wherein the processor is configured to obtain other data of at least one other channel of the given image, the at least one other channel comprising at least one of: a depth channel, an alpha channel, a surface normal channel, an object identifier channel, a material identifier channel, and/or a specular channel of the given image, wherein the other data of the given image is divided into its own respective blocks.

12. A method for encoding images, the method comprising:
obtaining colour data of colour channels of a given image and velocity data of a velocity channel of the given image, wherein the colour data and the velocity data respectively comprise colour values and velocity vectors of pixels of the given image;
identifying a plurality of groups of neighbouring pixels in the given image, wherein pixels of a given group have at least one of: velocity vectors that lie within a predefined threshold angle from each other, and/or velocity vectors whose magnitude lie within a predefined threshold value from each other;
dividing the colour data and the velocity data of the given image into their own respective blocks, based on the identified plurality of groups; and
encoding the blocks into encoded data;
wherein the colour data and the velocity data of the given image are divided into their own respective blocks in a hierarchical manner, based on at least one of:
a dynamic range of the colour values or the velocity vectors represented in the blocks, and/or
a manner in which the colour values or the velocity vectors change in the blocks,
and wherein the step of dividing comprises:
initially dividing the colour data and the velocity data into respective blocks at a same level of division depth; and
further dividing at least one block of the colour data into smaller blocks, based on a dynamic range of colour values in the at least one block of the colour data.

13. The method of claim 12, wherein a given block of the colour data and a corresponding block of the velocity data are encoded together into the encoded data.

14. The method of claim 12, wherein the predefined threshold angle lies in a range of 0 to 45 degrees.

15. The method of claim 12, wherein the predefined threshold value lies in a range of 0 to 10 pixels per milliseconds.

16. The method of claim 12, wherein the step of encoding comprises:
identifying at least one previous block of a previous image corresponding to a given block of the given image, based on velocity vectors of pixels in the given block and a frame time between two consecutive images; and including in the encoded data:
- a reference to previous encoded data of the at least one previous block of the previous image for the given block of the given image, and
- information indicative of at least one of: a position of the given block in the given image, a relative position of the given block with respect to the at least one previous block, a rotation to be applied, and/or a scaling to be applied.

17. The method of claim 16, further comprising obtaining a pose channel of the given image and a pose channel of the previous image, the pose channel of the given image being indicative of a given pose of a given user's head or of a given device from a perspective of which the given image is generated, the pose channel of the previous image being indicative of a previous pose of the given user's head or of the given device from a perspective of which the previous image is generated, wherein the step of encoding comprises:
- reprojecting the previous image from the previous pose to the given pose;
- determining whether the at least one previous block of the previous image matches the given block of the given image, based on matching of colour values in the given block of the given image with colour values in the reprojected at least one previous block of the reprojected previous image; and
- including the reference and the information in the encoded data, only when it is determined that the at least one previous block of the previous image matches the given block of the given image.

18. The method of claim 16, further comprising obtaining a pose channel of the given image and a pose channel of the previous image, the pose channel of the given image being indicative of a given pose of a given user's head or of a given device from a perspective of which the given image is generated, the pose channel of the previous image being indicative of a previous pose of the given user's head or of the given device from a perspective of which the previous image is generated, wherein the step of encoding comprises:
- reprojecting the given image from the given pose to the previous pose;
- determining whether the at least one previous block of the previous image matches the given block of the given image, based on matching of colour values in the reprojected given block of the reprojected given image with colour values in the at least one previous block of the previous image; and
- including the reference and the information in the encoded data, only when it is determined that the at least one previous block of the previous image matches the given block of the given image.

19. The method of claim 16, further comprising obtaining a pose channel of the given image and a pose channel of the previous image, the pose channel of the given image being indicative of a given pose of a given user's head or of a given device from a perspective of which the given image is generated, the pose channel of the previous image being indicative of a previous pose of the given user's head or of the given device from a perspective of which the previous image is generated, wherein the step of encoding comprises determining at least one of: the relative position of the given block with respect to the at least one previous block, the rotation to be applied, and/or the scaling to be applied, based on a difference between the given pose and the previous pose, the velocity vectors of the pixels in the given block, and velocity vectors of corresponding pixels in the at least one previous block.

20. The method of claim 16, wherein the step of encoding comprises encoding the given block of the given image as anew in the encoded data, when no previous block of any previous image matches the given block of the given image.

21. The method of claim 12, wherein the step of dividing comprises:
- initially dividing the colour data and the velocity data into respective blocks at a same level of division depth; and
- further dividing at least one block of the velocity data into smaller blocks, based on a dynamic range of velocity vectors in the at least one block of the velocity data.

* * * * *